US007861895B2

(12) United States Patent
Ray

(10) Patent No.: US 7,861,895 B2
(45) Date of Patent: Jan. 4, 2011

(54) HIGH VELOCITY FOAM PUMP

(75) Inventor: Eugene W. Ray, Barberton, OH (US)

(73) Assignee: GOJO Industries, Inc., Akron, OH (US)

( * ) Notice: Subject to any disclaimer, the term of this patent is extended or adjusted under 35 U.S.C. 154(b) by 472 days.

(21) Appl. No.: 12/077,250

(22) Filed: Mar. 18, 2008

(65) Prior Publication Data
US 2009/0236370 A1    Sep. 24, 2009

(51) Int. Cl.
*B67D 5/58* (2006.01)
(52) U.S. Cl. .................. 222/189.11; 222/190; 222/136; 222/339; 222/341; 222/133; 239/337; 239/339; 239/343
(58) Field of Classification Search .................. 222/190, 222/136, 133, 334, 336, 339–341, 189.11; 239/337, 339, 343
See application file for complete search history.

(56) References Cited

U.S. PATENT DOCUMENTS

| | | | | |
|---|---|---|---|---|
| 5,445,288 | A * | 8/1995 | Banks | 222/95 |
| 6,082,586 | A * | 7/2000 | Banks | 222/95 |
| 7,004,356 | B1 * | 2/2006 | Sayers | 222/137 |
| 7,461,762 | B2 * | 12/2008 | Law et al. | 222/190 |
| 7,661,561 | B2 * | 2/2010 | Ophardt et al. | 222/137 |
| 2004/0251277 | A1 * | 12/2004 | Tang | 222/185.1 |
| 2007/0023454 | A1 * | 2/2007 | Ophardt | 222/190 |
| 2007/0251953 | A1 * | 11/2007 | Criswell et al. | 222/105 |
| 2008/0237266 | A1 * | 10/2008 | Ciavarella et al. | 222/190 |
| 2009/0039111 | A1 * | 2/2009 | Tu | 222/190 |
| 2009/0188944 | A1 * | 7/2009 | Ciavarella et al. | 222/190 |
| 2009/0188994 | A1 * | 7/2009 | Ray et al. | 239/343 |

* cited by examiner

*Primary Examiner*—Kevin P Shaver
*Assistant Examiner*—Donnell Long

(57) ABSTRACT

A foam pump including a pump housing with a liquid chamber in fluid communication with a foamable liquid filled container and an air chamber in fluid communication with a high pressure air source through an air inlet. The foam pump also includes a dispensing tube having a wiper seal post with a closed distal end positioned within the pump housing, and an outlet tube with an open distal end positioned outside the pump housing. The wiper seal post includes at least one inlet hole in fluid communication with the liquid chamber, and a check valve near the second open end. The foam pump further includes at least one foam screen in the open end of the outlet tube, a wiper seal slidably positioned around the wiper seal post and in sealing contact with the pump housing and the wiper seal post, and a spring bias to bias the wiper seal in an unactuated position. The wiper seal forms a movable barrier between the liquid chamber and the air chamber and is adapted to slide axially along the wiper seal post past the inlet hole when actuated by high pressure air, thereby allowing the high pressure air to enter the dispenser tube and cause mixing of said air and foamable liquid within the dispensing tube. The mixture is then expelled through the check valve and the foam screen.

3 Claims, 2 Drawing Sheets

HIGH VELOCITY FOAM PUMP

TECHNICAL FIELD

The invention herein resides in the art of foam pumps, wherein a foamable liquid and air are combined to dispense a foam product. More particularly, the invention relates to a foam pump wherein air introduced to the pump at a high velocity acts to actuate the pump and to force an air and foamable liquid mixture through at least one screen to produce a uniform high quality foam product.

BACKGROUND OF THE INVENTION

For many years, it has been known to dispense liquids, such as soaps, sanitizers, cleansers, disinfectants, and the like from a dispenser housing maintaining a refill unit that holds the liquid and provides the pump mechanisms for dispensing the liquid. The pump mechanism employed with such dispensers has typically been a liquid pump, simply emitting a predetermined quantity of the liquid upon movement of an actuator. Recently, for purposes of effectiveness and economy, it has become desirable to dispense the liquids in the form of foam, generated by the interjection of air into the liquid. Accordingly, the standard liquid pump has given way to a foam generating pump, which necessarily requires means for combining the air and liquid in such a manner as to generate the desired foam.

Typically foam dispensers generate foam by pumping a foamable liquid stream and an air stream to a mixing area and forcing the mixture through a screen to better disperse the air as bubbles within the foamable liquid and create a more uniform foam product. The more minute and numerous the air bubbles the thicker and softer the foam, although too much air can cause the foam to be too dry feeling. The key to a desirable foam product is violent mixing of the foamable liquid and air to disperse the air bubbles within the liquid.

SUMMARY OF THE INVENTION

A foam pump having a pump housing having a liquid chamber and an air chamber, the liquid chamber being in fluid communication with a foamable liquid filled container, and the air chamber being in fluid communication with a high pressure air source through an air inlet. The foam pump also includes a dispensing tube partially disposed within the pump housing having a wiper seal post with a closed distal end positioned within the pump housing, and an outlet tube with an open distal end positioned outside the pump housing. The wiper seal post includes at least one inlet hole in fluid communication with the liquid chamber, and a check valve near the second open end. Additionally, the foam pump includes at least one foam screen located in the open end of the outlet tube; a wiper seal slidably and coaxially positioned around the wiper seal post, the wiper seal being in sealing contact with an inner wall of the pump housing and with the wiper seal post; and a spring bias positioned within the pump housing to bias the wiper seal in an unactuated position. The wiper seal forms a movable barrier between the liquid chamber and the air chamber and is adapted to slide axially along the wiper seal post away from the outlet tube and past the at least one inlet hole when actuated by high pressure air. Movement of the wiper seal allows high pressure air to enter the dispenser tube causing mixing of the air and foamable liquid within the dispensing tube, and also causing expulsion of the mixture through the check valve and the at least one foam screen.

DETAILED DESCRIPTION OF THE INVENTION

Figure 1:
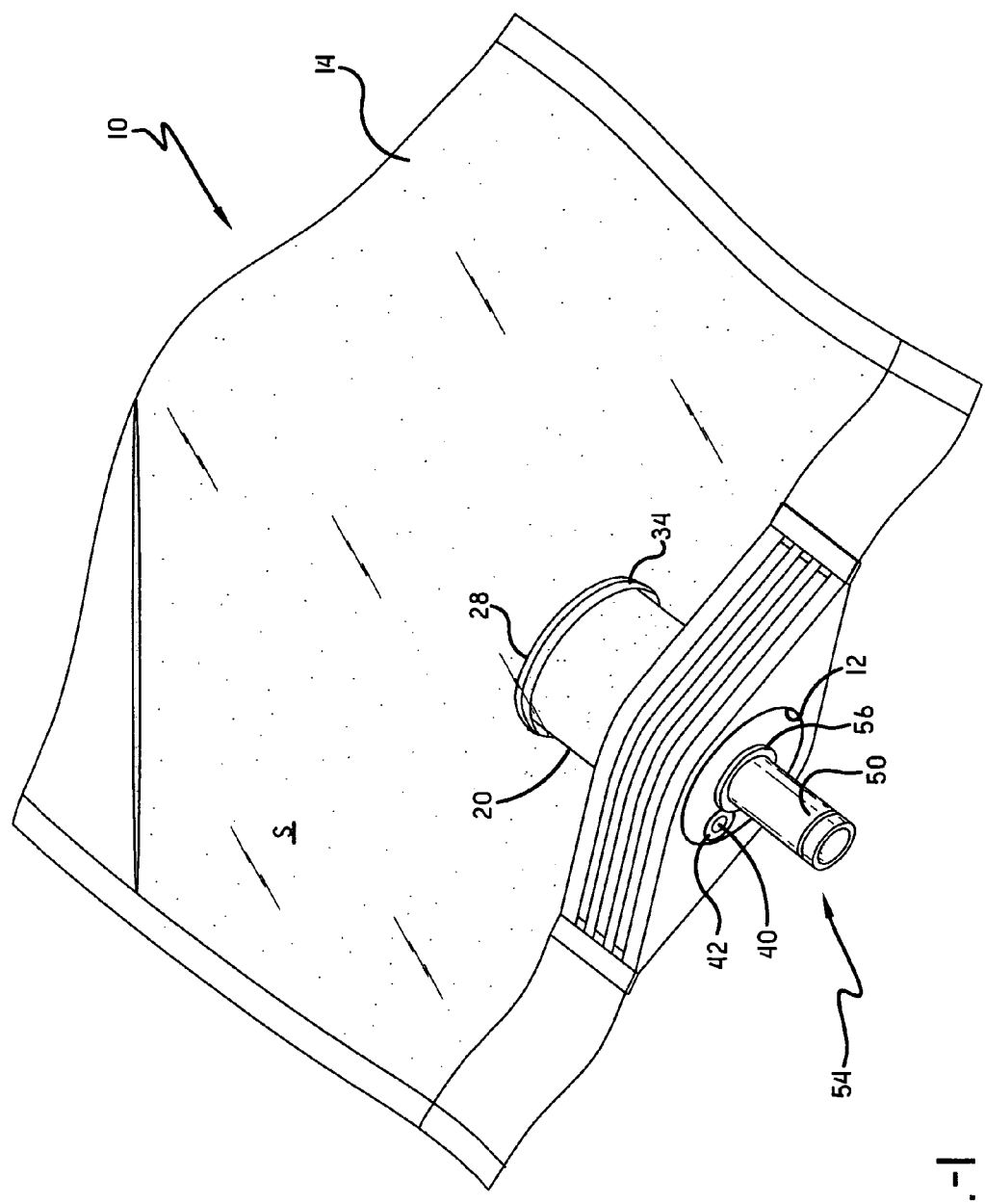
FIG. 1 is a perspective view of the foam pump and container according to the present invention.
Figure 3:
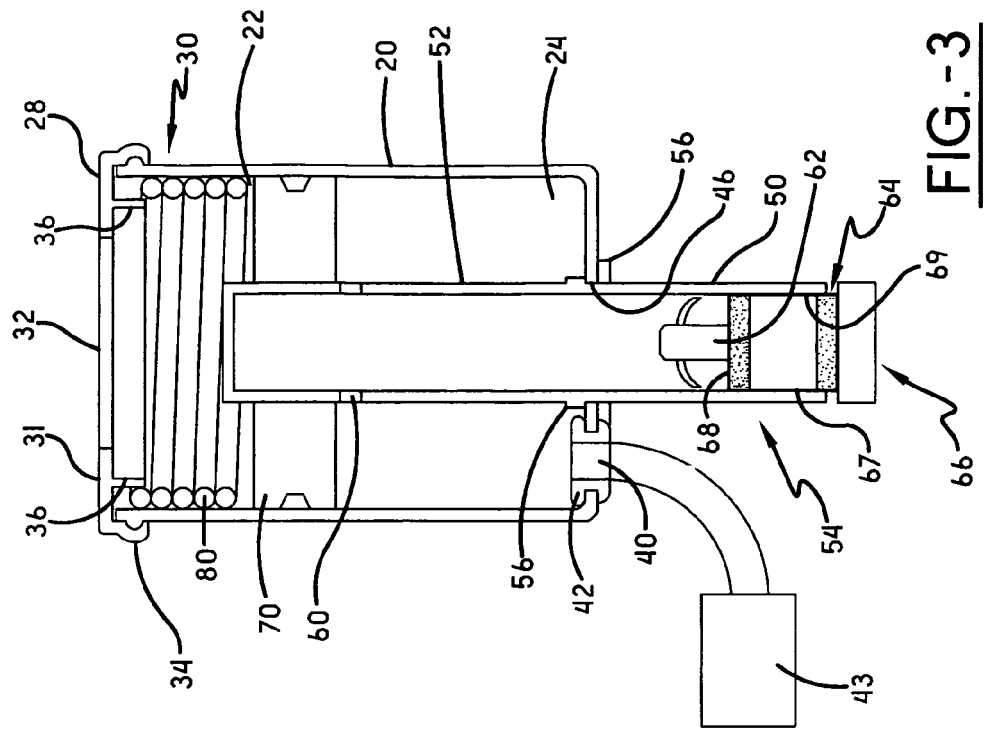
FIG. 3 is cross sectional side view of the foam pump of the present invention in an actuated state.
Figure 2:
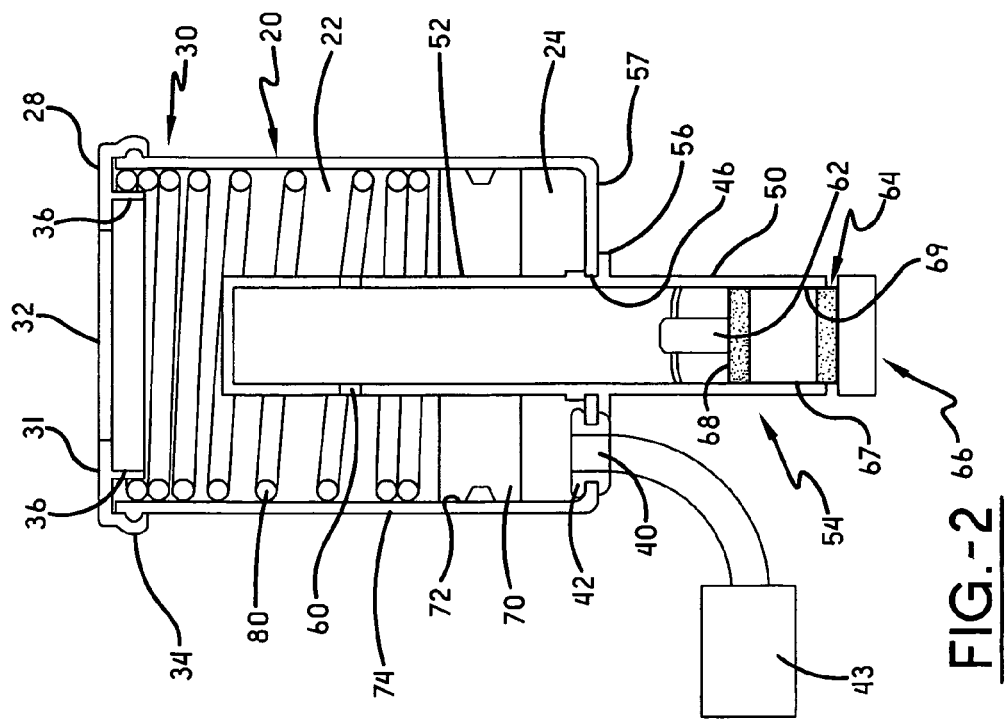
FIG. 2 is a cross sectional side view of the foam pump of the present invention in an unactuated state.

The high velocity foam pump of the present invention is shown in FIGS. 1-3 and is generally indicated by the number 10. Foam pump 10 may be positioned within an opening 12 of a container 14, such as, for example, a refill pouch as shown in FIG. 1. Container 14 has a foamable liquid S therein, and the portion of foam pump 10 located within container 14 is immersed in foamable liquid S. Container 14 may in the form of a flexible bag or collapsible bottle, as is known in the art.

Foam pump 10 includes a housing 20, the housing 20 having a liquid chamber 22 and an air chamber 24 therein. Housing 20 is equipped with a cap 28 positioned on an open first end 30 of housing 20. Cap 28 has a top planar surface 31 with a hole 32 therein, an outer lip 34 positioned around the periphery of first end 30 acting to secure cap 28 in place, and a flange 36 extending from top planar surface 31 and into liquid chamber 22. Hole 32 in cap 28 allows for fluid communication between liquid chamber 22 and container 14 so that foamable liquid S may flow into liquid chamber 22 under the effects of gravity or the effects of a vacuum created in liquid chamber 22. Housing 20 also includes an air inlet hole 40 in a portion of housing 20 defining air chamber 24. Air inlet hole also includes a seal 42, and is connected to a high pressure air source 43, such as a foot pump, bellows pump, or compressed air pump, for example, thereby allowing for fluid communication between air chamber 24 and the high pressure air source 43. Any conventional method of generating high pressure air due to a user actuation that is known to persons skilled in the art may be employed. Seal 42 minimizes pressure loss between the high pressure air source and air chamber 24 thereby increasing the efficiency of foam pump 10.

Housing 20 further includes a bore 46 in which is disposed a dispensing tube 50. Dispensing tube 50 extends through bore 46 to define a wiper seal post 52 as that portion of dispensing tube 50 within housing 20, and defines an outlet tube 54 as that portion extending through bore 46 and outside housing 20. Spaced flanges 56 extending radially from dispensing tube 50 secure dispensing tube 50 in place at bore 46. More particularly, flanges 56 rest on bottom wall 57 of housing 20 to prevent dispensing tube 50 from sliding out of housing 20. Flanges 56 may be replaced by a single flange completely surrounding the periphery of dispensing tube 50 and functioning in an identical manner to spaced flanges 56. Wiper seal post 52 located within housing 20 has a closed distal end and is equipped with at least one inlet hole 60 to allow foamable liquid S to flow from liquid chamber 22 into dispensing tube 50, although two or more inlet holes 60 are preferable. Outlet tube 54 of dispensing tube 50 has a check valve 62 disposed therein to control the outlet flow, check valve 62 being opened by increased pressure in a direction away from inlet hole 60 and returning to a closed state upon a decrease in pressure. Outlet tube 54 also includes at least one foam screen disposed therein adjacent to an outlet 66 at the distal end of dispensing tube 50. As seen in the figures, the at least one foam screen may be in the form of a mixing cartridge 64 which consists of a hollow tube 67 bounded on both ends by mesh screens 68 and 69.

Foam pump 10 further includes a wiper seal 70 slidably positioned coaxially around wiper seal post 52 within housing 20. Wiper seal 70 is in sealing contact with an internal wall 72 of sidewall 74 of housing 20 and with wiper seal post 52, thereby separating liquid chamber 22 from air chamber 24. More particularly, liquid chamber 22 is defined as the volume above wiper seal 70 and within sidewall 74 of housing 20. Although liquid chamber 22 is in open communication with container 14 through hole 32 in cap 28, for purposes of defining the foam pump 10, the liquid chamber should be viewed as only the volume within housing 20 surrounded by sidewall 74. Air chamber 24 is defined as the internal volume enclosed by wiper seal 70, sidewall 74 and bottom wall 57 of housing 20, and around wiper seal post 52. Wiper seal 70 can slide within housing 20 and thus, the volumes of liquid chamber 22 and container 14, and air chamber 24, are directly dependent upon the position of wiper seal 70. An increase in volume of air chamber 24 due to movement of wiper seal 70 towards cap 28 results in a decrease in the combined volume of liquid chamber 22 and container 14, and vice versa. Wiper seal 70 is biased to an unactuated position, as seen in FIG. 2, by a biasing spring 80 located between cap 28 and wiper seal 70. Spring 80 is held in place near open end 30 of housing 20 by flange 36.

In operation, foam pump 10 is actuated by an input of high pressure air generated by a user from high pressure air source 43 through air inlet hole 40. The increased pressure in air chamber 24 due to the high pressure air introduced begins actuation of the pump 10 and slides wiper seal 70 towards cap 28 against the biasing forces of spring 80. When wiper seal 70 slides completely past the at least one inlet hole 60, the high pressure air then enters dispensing tube 50 through the now exposed at least one inlet hole 60 and mixes with foamable liquid S already located in dispensing tube 50. The pressure established by introducing air from high pressure air source 43 forces check valve 62 to an open position, allowing the mixture to flow through dispensing tube 50 towards outlet 66. Prior to exiting dispensing tube 50 through outlet 66, the air and foamable liquid S mixture is forced through at least one foam screen 64. As a result of this process a high quality foam is dispensed from outlet 66. The high pressure mixing within dispensing tube 50 as well as the passage of the mixture through at least one foam screen 64 creates a uniformly mixed foam product.

Upon removal of the high pressure air, check valve 62 will return to a closed position, once again preventing flow of foamable liquid S out through dispensing tube 50. The decrease in pressure will also cause wiper seal 70 to return to an unactuated position by virtue of the biasing forces of spring 80. As wiper seal 70 moves axially along dispensing tube 50 towards air inlet 40 and passes the at least one inlet hole 60, foamable liquid will flow back into dispensing tube 50 due to gravity as well as slight vacuum forces generated by the expanding volume within liquid chamber 22 and container 14. Thus, upon returning to an unactuated state, foam pump 10 will be readied for subsequent actuations.

High pressure air source 43 may be activated by a sensor or by otherwise touch-less activation as is known in the art, or may include any conventional manual activation mechanism. High pressure air source 43 provides a metered volume of air to air chamber 24 sufficient to force wiper seal 70 up towards cap 28 and to mix with and force foamable liquid S within dispensing tube 50 out through outlet 66. The volume of air should not exceed that necessary to actuate foam pump 10 and dispense the foamed liquid S within dispensing tube 50 because subsequent to all of foamed liquid S exiting through outlet 66, only air will be flowing from foam pump 10. However, the metered volume of air should be sufficient to expel all of the air and foamable liquid mixture so as to prevent dripping from outlet 66 of residual liquid. Thus, high pressure air source 43 preferably provides a measured amount of high velocity air specific to the size and volume of air chamber 24 and dispensing tube 50 sufficient to expel the foam, but no more.

In light of the foregoing, it should be apparent that the present invention improves the art by providing a foam pump actuated by high velocity air. While a particular embodiment of this invention has been the focus for purposes of disclosing the invention, it should be appreciated that this invention can be modified in various ways without departing from the general concepts taught herein. Thus, this invention is not to be limited to or by any particular embodiment; rather, the claims will serve to define the invention.

What is claimed is:

1. A foam pump comprising:
(a) a pump housing having a liquid chamber and an air chamber, said liquid chamber being in fluid communication with a foamable liquid filled container, and said air chamber being in fluid communication with a high pressure air source through an air inlet;
(b) a dispensing tube partially disposed within said pump housing having a wiper seal post with a closed distal end positioned within said pump housing, and an outlet tube with an open distal end positioned outside said pump housing, said wiper seal post including at least one inlet hole in fluid communication with said liquid chamber, and a check valve near said second open end;
(c) at least one foam screen located in said open end of said outlet tube;
(d) a wiper seal slidably and coaxially positioned around said wiper seal post, said wiper seal being in sealing contact with an inner wall of said pump housing and with said wiper seal post; and
(e) a spring bias positioned within said pump housing to bias said wiper seal in an unactuated position;
wherein said wiper seal forms a movable barrier between said liquid chamber and said air chamber and wherein said wiper seal is adapted to slide axially along said wiper seal post away from said outlet tube and past said at least one inlet hole when actuated by high pressure air, thereby allowing said high pressure air to enter said dispenser tube and cause mixing of said air and foamable liquid within said dispensing tube and causing expulsion of said mixture through said check valve and said at least one foam screen.

2. The foam pump of claim 1, further comprising a cap secured to said housing around the periphery of a distal end of said housing and adjacent said liquid chamber, said cap having a hole therein.

3. The foam pump of claim 1, wherein said high pressure air source provides a metered volume of high pressure air sufficient to actuate the foam pump and expel said air and foamable liquid mixture through said outlet tube.

* * * * *